United States Patent
Chelnokov et al.

[15] 3,701,402
[45] Oct. 31, 1972

[54] VIBRATION DAMPER FOR VEHICLES

[72] Inventors: Ivan Ivanovich Chelnokov, Vladimir Mikhailovich Garbuzov, Perevoznaya; Vladimir Andreevich Koshelev, Georgy Mikhailovich Levit, Albert Alexandrovich Maltsev, all of Leningrad; Vladimir Fedorovich Myachev, Kalinin, all of U.S.S.R.

[73] Assignee: Leningradsky Institut Inzhenerov Zheleznoforozhnogo Transporta Imeni Akademika N. V. Obraztsova and Kalininsky Vagonostroitelny Zavod, Leningrad, and Kalinin, U.S.S.R.

[22] Filed: Feb. 3, 1970

[21] Appl. No.: 8,357

[30] Foreign Application Priority Data

Feb. 7, 1969    U.S.S.R. .................... 1309391

[52] U.S. Cl. .................. 188/314, 188/269, 188/322, 213/43
[51] Int. Cl. ............................................. F16f 9/34
[58] Field of Search ...... 188/269, 281, 297, 314, 315, 188/322, 279, 301; 213/8, 43

[56] References Cited

UNITED STATES PATENTS

| | | | |
|---|---|---|---|
| 2,038,032 | 4/1936 | Flynn | 188/314 X |
| 1,836,381 | 12/1931 | McNab | 188/269 |
| 1,855,064 | 4/1932 | Messier | 188/314 X |
| 2,818,142 | 12/1957 | Beaumont | 188/314 |

FOREIGN PATENTS OR APPLICATIONS 518,981   11/1955   Canada .................... 188/279

*Primary Examiner*—George E. A. Halvosa
*Attorney*—Waters, Roditi, Schwartz & Nissen

[57] ABSTRACT

A vibration damper for vehicles, particularly, for railway vehicles is disclosed, which comprises a single-acting working cylinder cooperating with a piston carried by a piston rod, this working cylinder forming thereinside a working or piston chamber communicating with a working fluid supply reservoir, the latter being disposed below or at a lower level than the closure seal through which the piston rod extends. Disposed adjacent to the bottom of this supply reservoir is a valve controlling communication through a working fluid replenishing passage, this valve being mounted in a structure having a space thereinside, adapted to establish a hydraulic seal therein; this space communicates, on the one hand, through a throttling passage with the piston chamber of the working cylinder, and, on the other hand, with the supply reservoir through the working fluid replenishing passage. Moreover, with the working cylinder of the vibration damper disposed horizontally, the throttling passage is adapted to establish fluid communication between the upper extremity of the piston chamber and the working fluid supply reservoir; the valve controlling communication through the replenishing passage being disposed adjacent to the bottom of the supply reservoir, below the level of the working fluid filling the supply reservoir in operation of the vibration damper. The above-mentioned structure, which is a removable one, receives thereinside the throttling passage and the replenishing passage, the valve controlling communication trough the replenishing passage and a safety valve.

4 Claims, 1 Drawing Figure

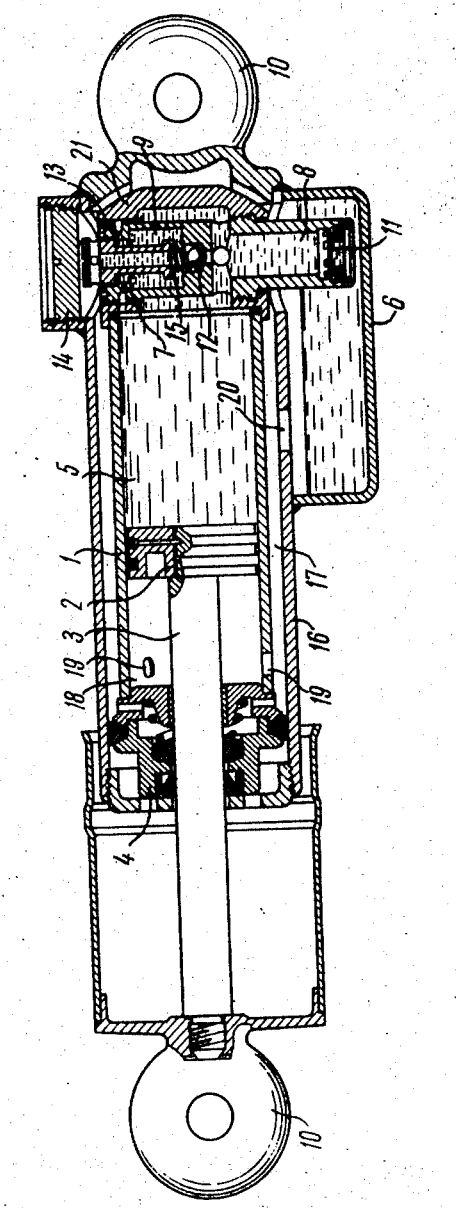

VIBRATION DAMPER FOR VEHICLES

The present invention relates to vibration dampers of the kind used in railway vehicles, road vehicles and tractors.

Widely known in the art is a vibration damper, particularly for railway vehicles, which comprises a single-acting working cylinder with a piston carried by a piston rod extending through a closure seal, a supply reservoir for a working fluid disposed above the closure seal and communicating with the piston chamber of the working cylinder through a throttling passage, and a replenishing passage associated with a control valve and a safety valve.

However, vibration dampers of this known type have an inadequately long operational life due to loss of the working fluid oil) thereof which leaks away through the closure seal. This results, among other things, in locating the reservoir, which supplies the working fluid into the piston chamber of the working cylinder, above the closure seal.

Cases are also encountered in which air gets into the piston chamber of the working cylinder and accumulates therein, which adversely affects the operation of the vibration damper. Moreover, with the working fluid leaking from the vibration damper through the closure seal, it becomes necessary to replenish periodically the supply of the working fluid in the vibration damper.

Additionally, in these known vibration dampers, cleaning of the passages, as well as maintenance and replacement of the valves and other worn parts, presents considerable difficulties.

It is an object of the present invention to eliminate these disadvantages.

It is another object of the present invention to provide a vibration damper for vehicles, having a supply reservoir for the working fluid, so disposed that the operational life of the vibration damper is considerably increased due to prevention of any leaking of the working fluid from the working cylinder. This, in turn, enables reduction of the amount of working fluid necessary for the operation of the vibration damper.

These and other objects are accomplished in a vibration damper for vehicles comprising a single-acting working cylinder cooperating with a reciprocating piston carried by a piston rod, said piston rod cooperating with a closure seal of said working cylinder, said vibration damper further comprising a supply reservoir for a working fluid, communicating with the piston chamber of said working cylinder through a throttling passage and replenishing passage associated with a control valve and a safety valve, in which vibration damper, inn accordance with the present invention, said supply reservoir for said working fluid is disposed below (at a lower level than) said closure seal, a space adapted to establish therein a hydraulic seal being provided between said throttling passage and said supply reservoir.

It has been found that a vibration damper of the above-described structure has a longer operational life than the hitherto known vibration dampers of similar kind. It has also been found that maintenance costs are reduced compared with hitherto known vibration dampers.

A vibration damper, embodying the present invention may have its cylinder disposed horizontally, with said throttling passage arranged to establish fluid communication between said supply reservoir and the extreme upper portion of said piston chamber of said working cylinder.

With the throttling passage thus arranged and disposed, any air accumulating in the piston chamber of the working cylinder is positively driven therefrom.

It is in a vibration damper, embodying the present invention, for said valve controlling communication through said replenishing passage to be disposed adjacent to the bottom of said supply reservoir, below the level of said working fluid filling said reservoir during operation of said vibration damper.

The last-mentioned feature makes it possible for a vibration damper, embodying the present invention, to operate with a reduced amount of the working fluid, as compared with hitherto known vibration dampers of similar characteristics.

It is advantageous in a vibration damper, constructed in accordance with the present invention, to incorporate a removable structure disposed adjacent to the external end portion of said piston chamber, said removable structure receiving thereinside said replenishing passage, said throttling passage, said control valve and said safety valve.

The last-described feature has been found to provide facilitated maintenance and replacement of worn parts, as well as for simpler cleaning of the passages of the vibration damper.

Given below is a detailed description of a vibration damper with due reference being had to the accompanying drawing in which the sole figure is a longitudinal sectional view of a vibration damper in accordance with the invention.

In the appended drawing is shown a single-acting vibration damper for vehicles such as, more particularly, railway vehicles. It comprises a horizontally disposed cylinder 1 cooperating with a piston 2 supported by a piston rod 3 extending through a closure seal 4.

The piston chamber or working chamber 5 of the working cylinder 1 has disposed adjacent thereto a supply reservoir 6 for the working fluid, which reservoir is positioned, in relative vertical sense, below or at a lower level than the seal 4 and communicates with the working chamber 5 through a throttling or metering passage 7 and through a replenishing passage 8, the two passages being separated by the space 9 of a hydraulic seal.

The cylinder 1 and the piston rod 3 have rigidly connected thereto respective of a pair of eye-rings 10.

The throttling passage 7 communicates with the upper portion of the working chamber 5 of the horizontally disposed working cylinder 1, the last-mentioned communication serving for removing air from the working chamber 5. Disposed adjacent to the bottom of reservoir 6, below the level of the working fluid in the replenishing passage 8, is a control valve 11, which latter is in communication with the hydraulic seal space 9 and, consequently, with the throttling passage 7.

In order to facilitate and simplify replacement of the comparatively rapidly wearing parts of the herein disclosed vibration damper, the replenishing passage 8 and the throttling passage 7, as well as the control valve 11 and a safety valve 12 are all either carried by or made part of a removable structure 13, which is adapted to be threadedly secured within a corresponding bore provided in the casing of the cylinder 1, this structure 13 being further adapted to be inserted into this bore or removed therefrom through a corresponding opening provided in said cylinder casing above said bore and vertically aligned therewith, this opening being sealingly closed in operation be means of a closure 14.

The space inside a hollow adjustment screw 15, which latter cooperates with the safety valve 12, together with the internal space of the structure 13, form the space 9 of the hydraulic seal, this space 9 being in communication with the throttling passage 7.

Disposed intermediate the housing 16 of the vibration damper and the wall of the working cylinder 1 is can annular space 17 communicating with the piston rod chamber 18 of the cylinder 1 through three circumferentially spaced openings 19, the space 17 also communicating with the supply reservoir 6 through a port 20. The portion 21 of the casing of the cylinder 1, which has therein the bore adapted to receive the structure 13, is secured in any known manner to the body proper of the working cylinder 1.

The herein disclosed vibration damper operates as follows.

When the piston rod 3 is being withdrawn from the cylinder 1 of the herein disclosed vibration damper by the application thereto of an external force, a portion of the working fluid is driven by suction from the reservoir 6 through the control valve 11 into the piston chamber 5 of the cylinder 1.

The volume of this portion of the working fluid is considerably greater than the volume of air sucked in simultaneously into the piston chamber 5 through the throttling passage 7 (the abovesaid refers to the initial cycle of operation of the herein disclosed vibration damper).

When the piston rod 3, together with the piston 2 are now driven into the working cylinder 1 of the vibration damper, the control valve 11 closes automatically under the action of the pressure of the working fluid developed in the piston chamber 5, whereby a portion of the air remaining in the working chamber 5 of the cylinder 1 is driven therefrom through the throttling passage 7 into the space 9. After several consecutive reciprocating cycles of the piston 2, the working fluid fills completely the piston chamber 5 of the cylinder 1.

Thereafter, a next consecutive displacement of the piston rod 3 and the piston 2 into the cylinder 1 drives a portion of the working fluid from the piston chamber 5 through the throttling passage 7, this portion first filling completely the space 9 of the hydraulic seal, whereafter the rest of the working fluid driven from the piston chamber 5 overflows the space 9 into the annular space 17 about the cylinder 1, wherefrom it flows by gravity into the reservoir 6 through the port 20. Thereafter, no air can get into the piston chamber 5 of the cylinder 1 through the throttling passage 7, because the space 9 is filled with the working fluid and acts as a hydraulic seal. The throttling passage 7 communicating with the upper extremity of the piston chamber 5 of the horizontally disposed working cylinder 1 (as has been already described), any accumulation of air inside this chamber 5 is positively prevented after a series of repeated double strokes of the piston 2. Additionally, clogging of this throttling passage 7 is also prevented.

Should the pressure of the working fluid inside the piston chamber 5 of the working cylinder 1 rise above a pre-set level, this pressure would drive the safety ball valve 12 off its seat, and the superfluous fluid would be driven via the space 9 into the annular chamber 17 (a desired pressure level may be pre-set by means of the adjustment screw 15 which compresses a spring keeping the safety ball valve 12 in its closed position against its seat).

Should any amount of the working fluid be driven past the piston 2 from the piston chamber 3 into the piston rod chamber 18 of the working cylinder 1, on account of inadequate seal of the piston and the cylinder, this working fluid would flow by gravity through one or more of the openings 19 into the annular space 17, wherefrom it would flow back into the reservoir 6 through the port 20. Therefore, conditions under which the working fluid would leak through the seal 4 are prevented and, hence, the working fluid cannot leak from the herein disclosed vibration damper.

The replenishing control valve 11 being disposed adjacent to the bottom of the working fluid supply reservoir 6, it operates normally even when the level of the working fluid in the latter is comparatively low.

Although the present invention has been described in connection with a preferred embodiment thereof, it should be understood that various modifications and changes may take place in the construction of a vibration damper, embodying the invention, without departing from the spirit and scope of the invention, as defined in the claim to follow, as those skilled in the art will readily understand.

What is claimed is:

1. A vibration damper for vehicles comprising: a single-acting working cylinder provided with a piston chamber therein, aid piston chamber being adapted to be filled with a working fluid, said cylinder being adapted or operation in horizontal attitude and having opposite ends; a piston and a piston rod carrying said piston, said piston and said piston rod being reciprocally received in the chamber in said working cylinder; a closure seal for said piston rod disposed in said chamber adjacent to one end of said working cylinder, said piston rod extending in sealed relation through said closure seal; a working fluid replenishing passage means on the cylinder at the other end thereof; a supply reservoir for said working fluid disposed at a lower level than said closure seal and being adapted to communicate with said piston chamber of said working cylinder through said working fluid replenishing passage means; a throttling passage means on said other end of the cylinder; a structure on said other end of said cylinder and provided with a hollow space thereinside, a hydraulic seal means in said space, said space communicating, on the one hand, with said piston chamber of said working cylinder through said throttling passage means and, on the other hand, with said working fluid replenishing passage means; control valve means; and safety valve means, said safety valve means and control valve means being located at opposite ends of said working fluid replenishing passage means and respectively adjacent said space and said supply reservoir to respectively control the flow of working fluid from said replenishing passage means into said space and from the reservoir into said replenishing passage means; said damper further comprising a housing encircling said cylinder and supporting said reservoir in depending relation on said cylinder, said housing defining with said cylinder an annular space communicating with the piston chamber and said reservoir respectively through openings provided in said housing, said hydraulic seal means separating said throttle passage means and said replenishing passage means.

2. A vibration damper, according to claim 1, wherein said working cylinder is disposed substantially horizontally, said throttling passage means communicating with the upper extremity of said piston chamber of said working cylinder and being adapted to establish communication between said upper extremity of said piston chamber and said working fluid supply reservoir.

3. A vibration damper, according to claim 2, wherein said working fluid supply reservoir has a bottom, said valve controlling communication through said working fluid replenishing passage means being disposed adjacent to said bottom of said reservoir, below the level of said working fluid thereinside in operation of said vibration damper.

4. A vibration damper, according to claim 3, wherein, said structure removably accomodates thereinside said throttling passage means, said replenishing passage means, said control valve means and said safety valve means.

* * * * *